United States Patent
Chen et al.

(10) Patent No.: US 9,753,333 B2
(45) Date of Patent: Sep. 5, 2017

(54) METHOD FOR FABRICATING THE LIQUID CRYSTAL DISPLAY PANELS INCLUDING POURING LIQUID CRYSTAL INTO DUMMY AND PANEL GROUP REGIONS TO RESIST PRESSURE DIFFERENCES

(71) Applicant: CHUNGHWA PICTURE TUBES, LTD., Taoyuan (TW)

(72) Inventors: Wei-Yen Chen, Miaoli County (TW);
Yu-Chun Tsai, Kaohsiung (TW);
Yuan-Chieh Hsu, Taichung (TW);
Te-Liang Liu, Taoyuan (TW);
Min-Cheng Wang, New Taipei (TW)

(73) Assignee: CHUNGWAI PICTURE TUBES, LTD., Taoyuan (TW)

( * ) Notice: Subject to any disclaimer, the term of this patent is extended or adjusted under 35 U.S.C. 154(b) by 0 days.

(21) Appl. No.: 14/882,441

(22) Filed: Oct. 13, 2015

(65) Prior Publication Data
US 2017/0102567 A1    Apr. 13, 2017

(51) Int. Cl.
*G02F 1/1339* (2006.01)
*G02F 1/1341* (2006.01)
*G02F 1/1333* (2006.01)

(52) U.S. Cl.
CPC .......... *G02F 1/1339* (2013.01); *G02F 1/1341* (2013.01); *G02F 2001/133354* (2013.01); *G02F 2001/133388* (2013.01)

(58) Field of Classification Search
None
See application file for complete search history.

(56) References Cited

U.S. PATENT DOCUMENTS

| 6,683,670 | B2 | 1/2004 | Chung et al. | |
| 2004/0226652 | A1* | 11/2004 | Murata | G02F 1/1341 156/292 |
| 2006/0164590 | A1* | 7/2006 | Liu | G02F 1/1309 349/190 |
| 2006/0176439 | A1* | 8/2006 | Tashiro | G02F 1/1303 349/190 |
| 2007/0146622 | A1* | 6/2007 | Yang | G02F 1/1341 349/187 |
| 2013/0196565 | A1* | 8/2013 | Miyake | G02F 1/1337 445/25 |
| 2014/0118826 | A1* | 5/2014 | Jiao | G02B 5/30 359/491.01 |

FOREIGN PATENT DOCUMENTS

TW    I434112 B    4/2014

\* cited by examiner

*Primary Examiner* — Jay C Chang
(74) *Attorney, Agent, or Firm* — CKC & Partners Co., Ltd.

(57) ABSTRACT

A method for fabricating liquid crystal display panels. The method includes forming at least one adhesive structure on a first substrate, to partition the first substrate into at least one dummy region and panel group regions, in which the dummy region is located between the two adjacent panel group regions; pouring liquid crystal into the dummy region and the panel group regions; and conjugating a second substrate at a side of the first substrate disposed with the adhesive structure, to seal spaces of the dummy region and the panel group regions between the first substrate and the second substrate, in which the liquid crystal can fill up the spaces of the panel group regions and at least a part of the spaces of the dummy region being sealed between the first substrate and the second substrate.

12 Claims, 9 Drawing Sheets

METHOD FOR FABRICATING THE LIQUID CRYSTAL DISPLAY PANELS INCLUDING POURING LIQUID CRYSTAL INTO DUMMY AND PANEL GROUP REGIONS TO RESIST PRESSURE DIFFERENCES

BACKGROUND

Technical Field

The present disclosure relates to a liquid crystal display apparatus. More particularly, the present disclosure relates to a method for fabricating liquid crystal display panels.

Description of Related Art

Typically, a liquid crystal display panel is made by a method including forming a dummy region between any of two adjacent panel group regions on a substrate, which are partitioned by at least one adhesive structure. However, it is also required in the method to conjugate a color filter onto a surface of the adhesive structure away from the substrate. Owing to the conjugating of the color filter may compress the flexible adhesive structure between the color filter and the substrate, the air remaining inside the dummy region may be under pressure to penetrate into the panel group regions, and becomes bubbles within visual area of the panel group regions, which deteriorates the yield rate of fabricating liquid crystal display panels.

In addition, the liquid crystal filled-up panel group regions aside with the empty dummy region would accordingly generate pressure difference in the process of conjugating the color filter. As such, the force exerting on the adhesive structure owing to the pressure difference may crash a part of the adhesive structure causing leakage of the liquid crystal inside the panel group regions. The leakage of the liquid crystal may also reduce the yield rate of fabricating liquid crystal display panels.

As aforementioned, the typical methods for fabricating liquid crystal display panels exist drawbacks that need further improvements. Therefore, to deal with aforesaid problem effectively is an important subject of research and development, and also a desired improvement in the art. Practitioners of ordinary skill in the art have striven to attain a solution.

SUMMARY

The present disclosure provides a method for fabricating liquid crystal display panels. The method includes forming at least one adhesive structure on a first substrate, to partition the first substrate into at least one dummy region and panel group regions, in which the dummy region is located between the two adjacent panel group regions; pouring liquid crystal into the dummy region and the panel group regions; and conjugating a second substrate at a side of the first substrate disposed with the adhesive structure, to seal spaces of the dummy region and the panel group regions between the first substrate and the second substrate, in which the liquid crystal can fill up the spaces of the panel group regions and at least a part of the spaces of the dummy region being sealed between the first substrate and the second substrate.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
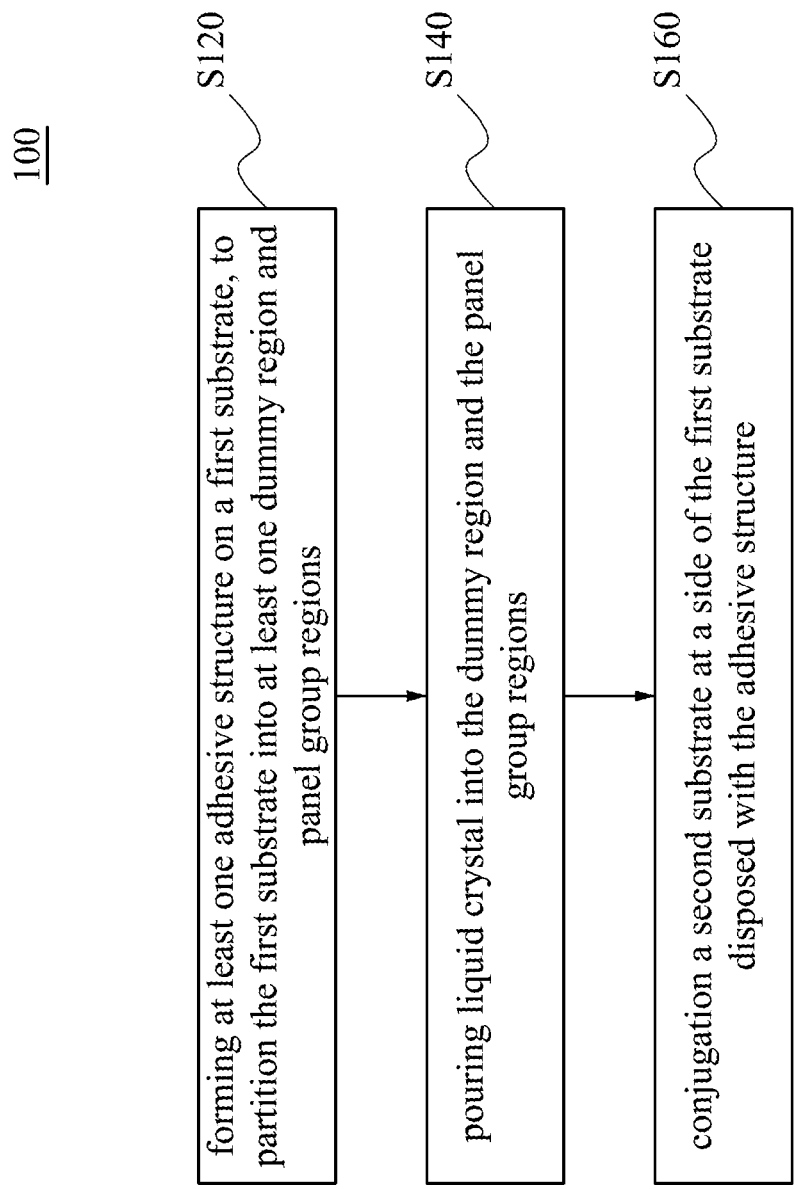
FIG. 1 is a flow chart of a method for fabricating liquid crystal display panels according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that when an element is referred to as being "on" another element, it can be directly on the other element or intervening elements may be present therebetween. In contrast, when an element is referred to as being "directly on" another element, there are no intervening elements present.

FIG. 1 illustrates a flow chart of a method 100 for fabricating liquid crystal display panels according to an embodiment of the present disclosure. As shown in FIG. 1, the method 100 for fabricating liquid crystal display panels, which includes step S120 to step S160. In step S120, at least one adhesive structure is formed on a first substrate to partition the first substrate into at least one dummy region and panel group regions. The dummy region is located between the two adjacent panel group regions. In step S140, liquid crystal is poured into the dummy region and the panel group regions. In step S160, a second substrate is conjugated at a side of the first substrate disposed with the adhesive structure. Spaces of the dummy region and the panel group regions are sealed between the first substrate and the conjugated second substrate. In some embodiments, the liquid crystal can fill up the spaces of the panel group and at least part of the space of the dummy region sealed between the first substrate and the second substrate.

Owing to the method 100 for fabricating liquid crystal display panels additionally pours the liquid crystal to fill up the spaces of the panel group regions and at least part of the space of the dummy region sealed between the first substrate and the second substrate, so that the method 100 can effectively prevent or avoid residual air inside the dummy region penetrating into the panel group regions under the conjugating of the second substrate onto the adhesive structure. In addition, pouring the liquid crystal inside the dummy region also can balance the pressure difference between the panel group regions filled up with the liquid crystal and the dummy region, to maintain and support the adhesive structure being intact. Therefore, the method 100 can decrease or avoid residual air penetrating into a visual region of the liquid crystal display panel, in the manner that pouring the liquid crystal to fully eliminate residual air inside the dummy region and balance the pressure difference exerted between the dummy region and the panel group regions, to keep the adhesive structure intact. Therefore, the method 100 can increase yield rate of fabricating liquid crystal display panels by diminishing the residual air penetration.

Figure 2:
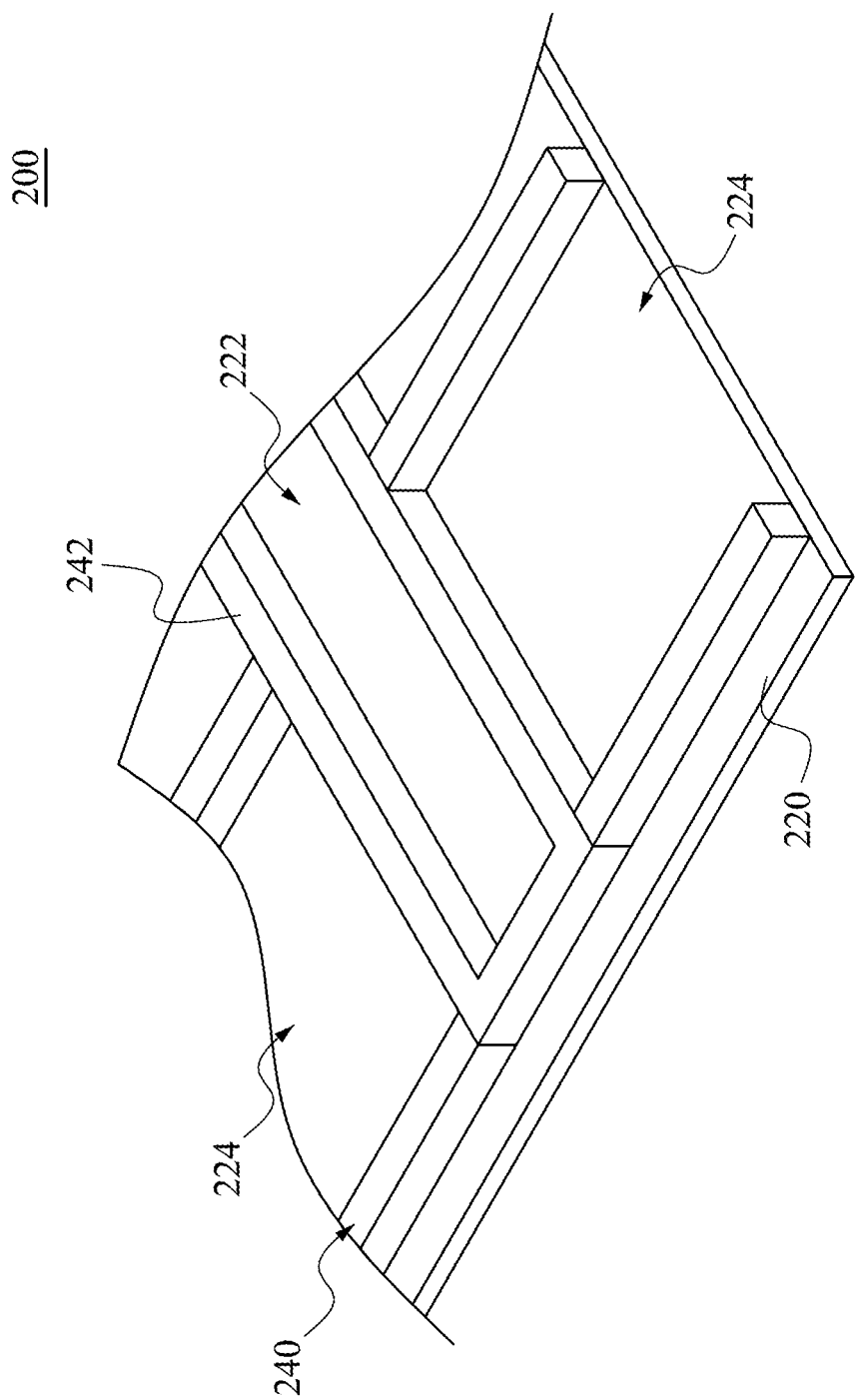
FIG. 2 to FIG. 4 are longitudinal sectional views of liquid crystal display panels under sequential fabricating processes according to an embodiment of the present disclosure.
Figure 3:
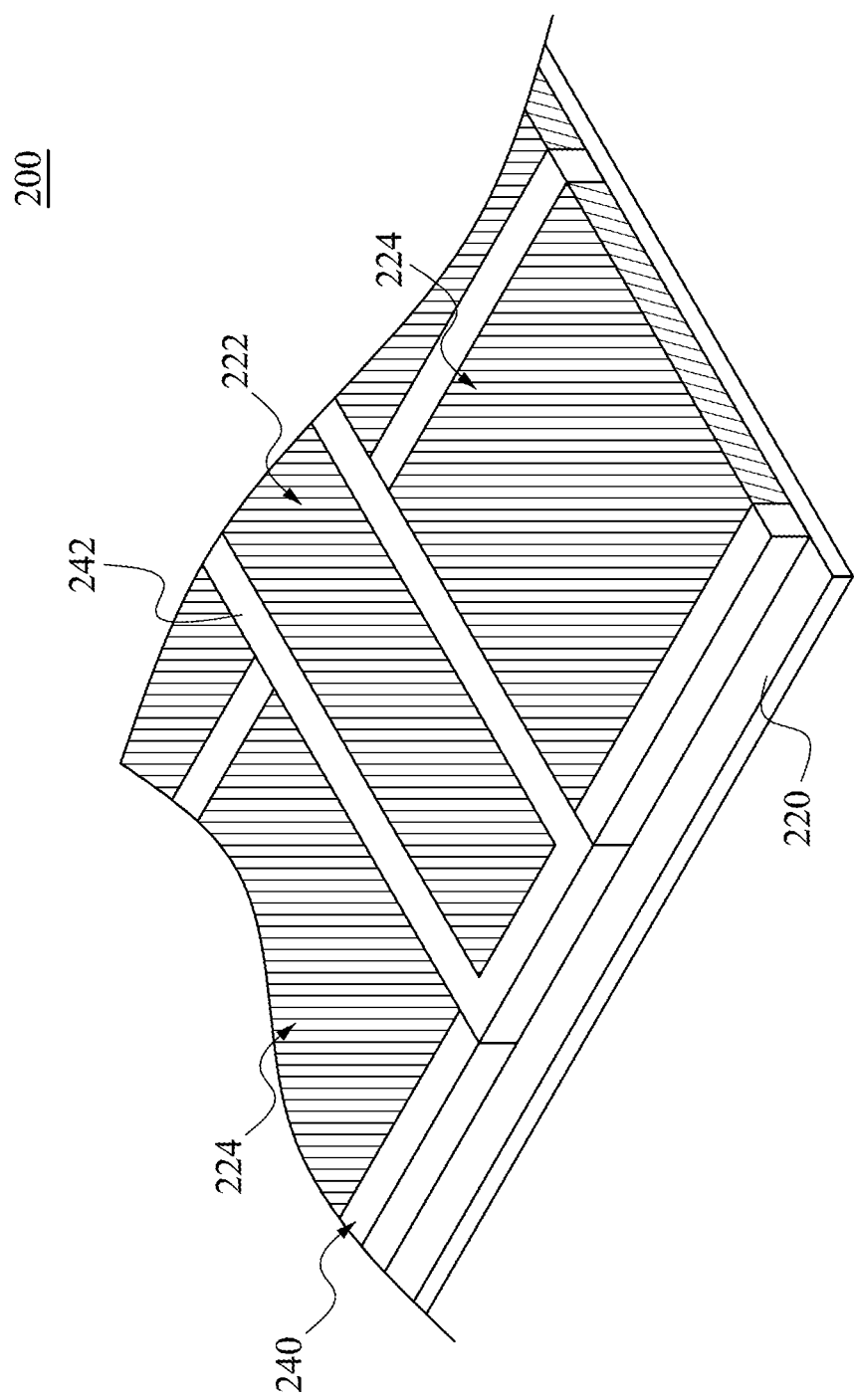
Figure 4:
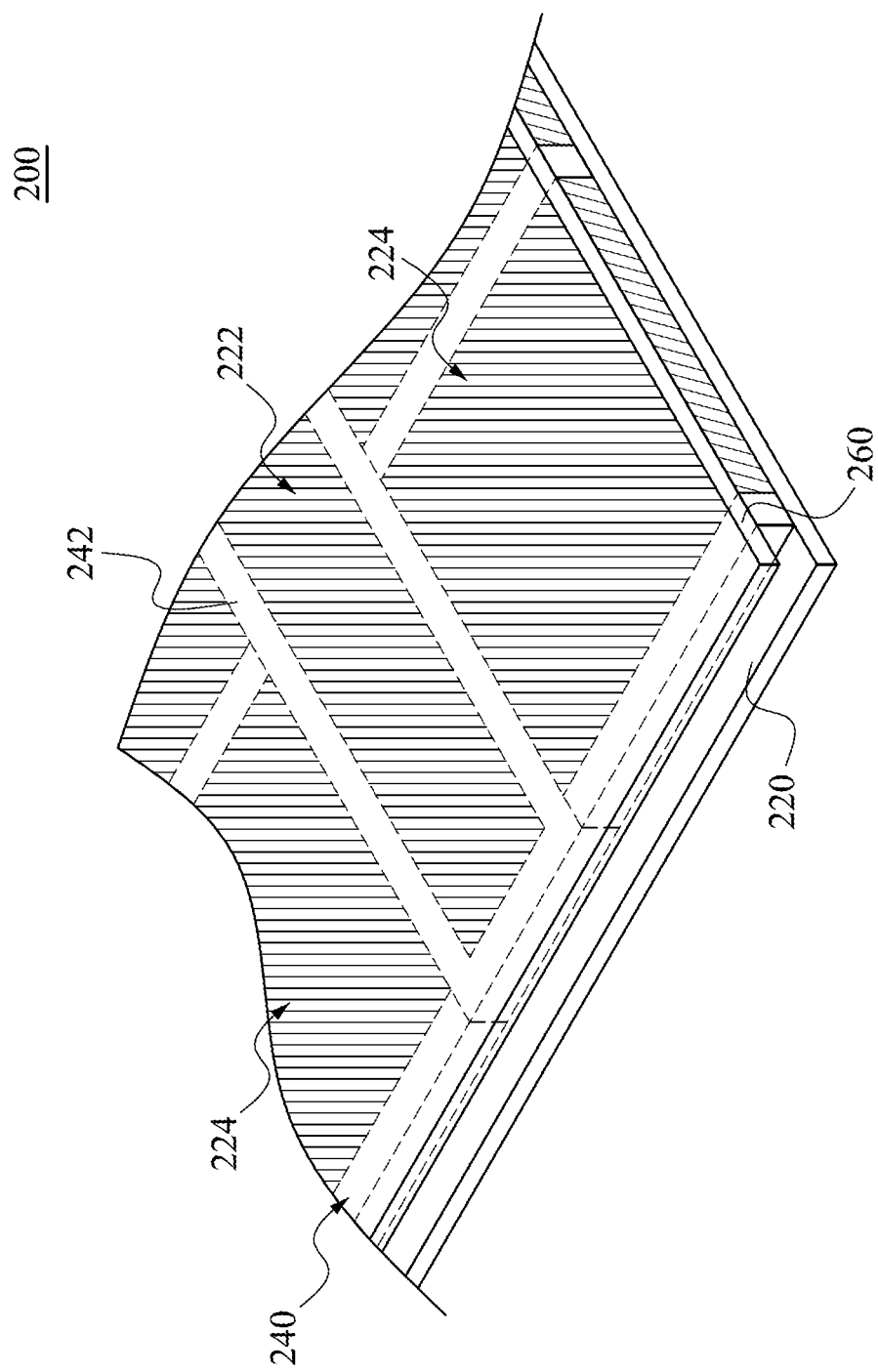

FIG. 2 to FIG. 4 illustrate longitudinal sectional views of liquid crystal display panels 200 under sequential fabricating processes according to an embodiment of the present disclosure. As shown in FIG. 2, a curable adhesive is coated or disposed onto the first substrate 220, and then the curable adhesive is cured to form the adhesive structure 240. In some embodiments, the curable adhesive can be a light-curing adhesive or a heat-curing adhesive. In some embodiments, the curable adhesive may be formed of a thermo-hardening resin, a photo ultraviolet hardening resin, or a thermo- and photo-hardening resin, for example. The adhesive structure 240 can partition the first substrate 220 into at least one dummy region 222 and the panel group regions 224. The dummy region 222 is located between the two adjacent panel group regions 224.

On the other hand, the forming of the adhesive structure 240 on the first substrate 220 can include forming barrier portions 242 on the first substrate 220. The barrier portions 242 are surrounded or confined the first substrate 220 into several sections to form the at least one dummy region 222. Each of the barrier portions 242 can separates the two adjacent panel group regions 224. In some embodiments, at least part of the adhesive structure 240 is composed by the barrier portions 242. In some embodiments, any of the two adjacent panel group regions 224 have one of the barrier portions 242 disposed in-between. In some embodiments, the panel group regions 224 may include panels. The forming of the adhesive structure 240 on the first substrate 220 further includes partitioning the panel group regions 224 into the panels. The panels are configured to be manufactured into liquid crystal display panels by cutting or dividing from the panel group regions 224.

Thereafter, liquid crystal is poured into the dummy region 222 and the panel group regions 224, to fully eliminate residual air inside the dummy region 222 and the panel group regions 224, as shown in FIG. 3. As FIG. 4 illustrated, subsequently, a second substrate 260 is conjugated or bonded at a side of the first substrate 220 disposed with the adhesive structure 240, on the other hand, the second substrate 260 is conjugated onto a surface of the adhesive structure 240 away from the first substrate 220. Spaces of the dummy region 222 and the panel group regions 224 are sealed between the first substrate 220 and the second substrate 260, in which the liquid crystal fills up the spaces of the dummy region 222 and the panel group regions 224 sealed between the first substrate 220 and the second substrate 260. On the other hand, pouring of the liquid crystal is to fill up spaces of the barrier portions 242 and the panel group regions 224 sealed between the first substrate 220 and the second substrate 260. In other embodiments, the liquid crystal only fills up a part of the dummy region 222, which would be described in detail later.

Due to the fabricating of the liquid crystal display panels 200 pours the liquid crystal to fill up the spaces of the panel group regions 224 and the dummy region 222 sealed between the first substrate 220 and the second substrate 260, to eliminate the residual air, such that the liquid crystal display panels 200 can prevent the residual air penetrating into the panel group regions 224 under the conjugating of the second substrate 260 onto the adhesive structure 240. In addition, the liquid crystal inside the dummy region 222 can balance the pressure difference produced by liquid crystal inside the panel group regions 224, to maintain the adhesive structure 240 being intact. Therefore, the fabricating of the liquid crystal display panels 200 may avoid residual air penetrating into the predetermined visual region of the liquid crystal display panel, such as panel group regions 224, in the manner that pouring the liquid crystal to fully eliminate residual air inside the dummy region 222 and balance the pressure difference on the adhesive structure 240 between the dummy region 222 and the panel group regions 224 to keep the adhesive structure 240 or the barrier portions 242 intact. Therefore, the liquid crystal display panels 200 can be manufactured with increasing yield rate by diminishing the residual air penetration and keeping the adhesive structure 240 intact.

Figure 5:
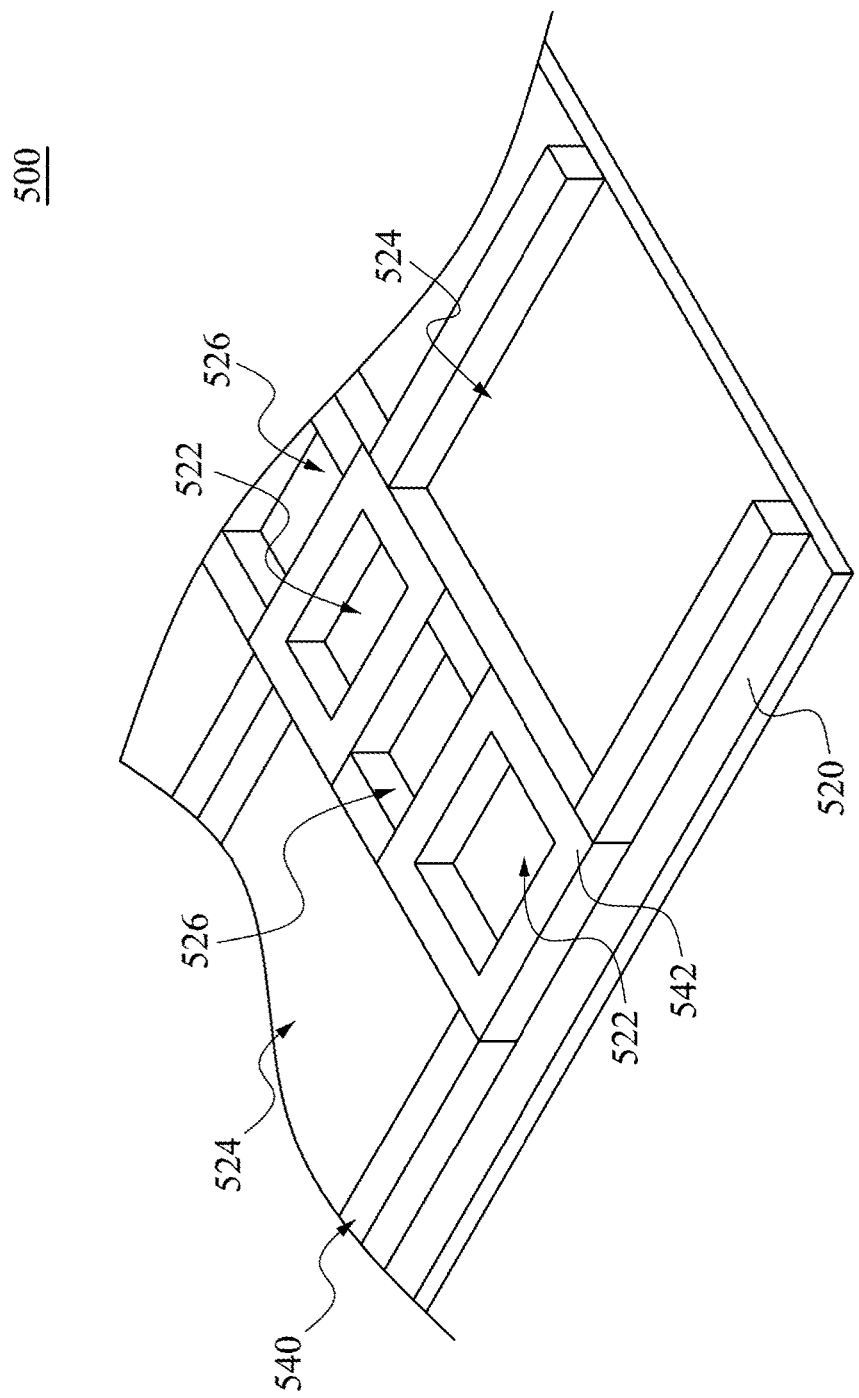
FIG. 5 to FIG. 6 are longitudinal sectional views of liquid crystal display panels under sequential fabricating processes according to another embodiment of the present disclosure.
Figure 6:
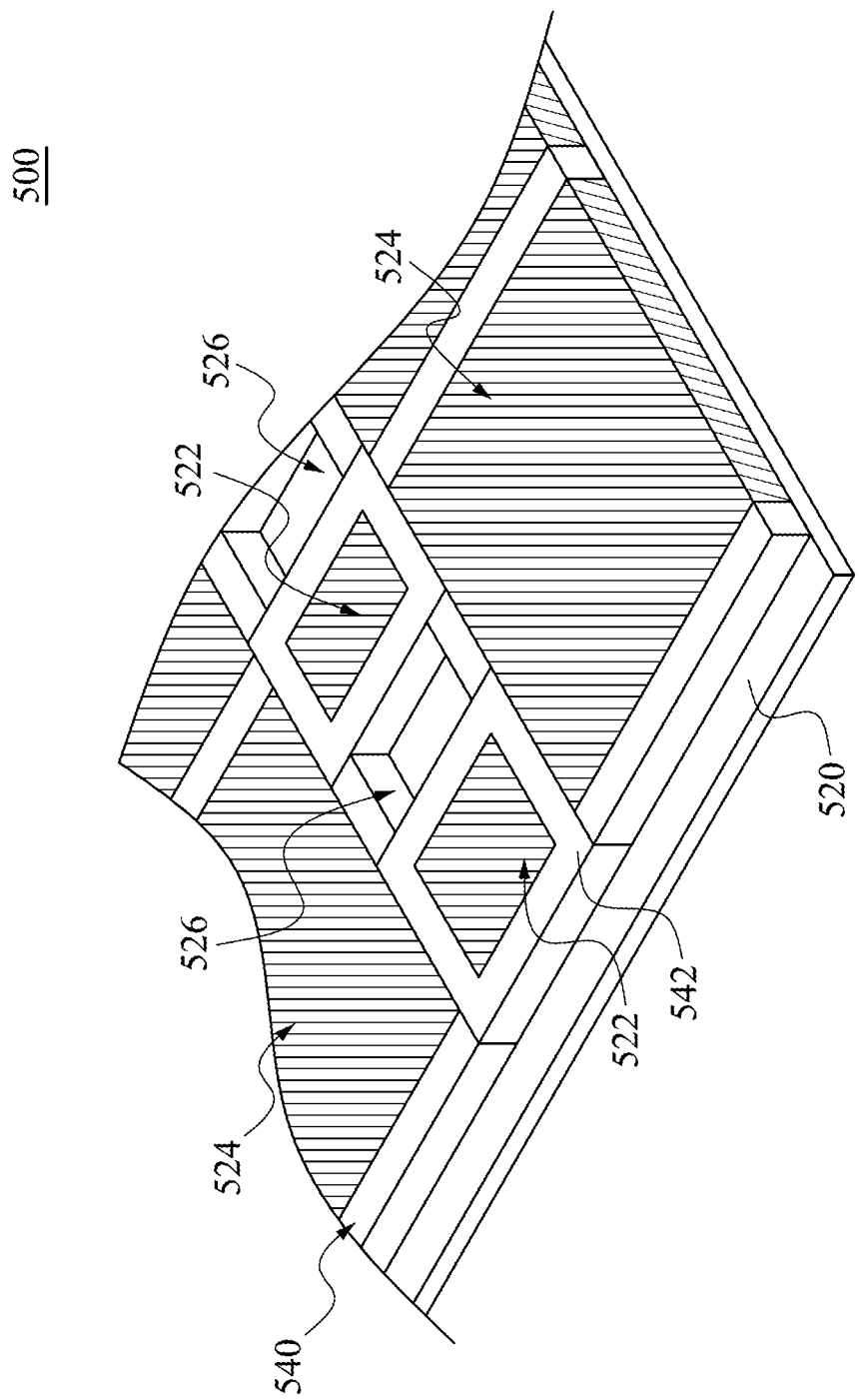

FIG. 5 to FIG. 6 illustrate longitudinal sectional views of liquid crystal display panels 500 under sequential fabricating processes according to another embodiment of the present disclosure. The adhesive structure 540 can partition the first substrate 520 into the panel group regions 524, the dummy regions 522, and at least one gap 526. The dummy regions 522 can be located between the two adjacent panel group regions 524. The gap 526 is located between every two adjacent dummy regions 522 that are between the same of the two adjacent panel group regions 524.

On the other hand, the forming of the adhesive structure 540 on the first substrate 520 can include forming barrier portions 542 on the first substrate 520. The barrier portions 542 are surrounded or confined the first substrate 520 into sections to form the dummy regions 522. Each of the barrier portions 542 separates the two adjacent panel group regions 524. In some embodiments, at least part of the adhesive structure 540 is composed by the barrier portions 542. In some embodiments, any of the two adjacent panel group regions 524 have several barrier portions 542 disposed inbetween. The barrier portions 542 disposed between the same of the two adjacent panel group regions 522 may have the gap 526 disposed inbetween.

Thereafter, as shown in FIG. 6, liquid crystal is poured into the dummy regions 522 and the panel group regions 524, to fill up the panel group regions 524 and the dummy regions 522, and the residual air inside the panel group regions 524 is fully eliminated. The gap 526 between the two adjacent dummy regions 522 remains empty without liquid crystal poured inside. Subsequently, as FIG. 4 illustrated, a second substrate can also be conjugated or bonded at a side of the first substrate 520 disposed with the adhesive structure 540.

Due to the fabricating of the liquid crystal display panels 500 pours the liquid crystal to fill up the spaces of the dummy regions 522 and the panel group regions 524 sealed between the first substrate 520 and the second substrate, such that the liquid crystal inside the dummy regions 522 can support the adhesive structure 540 to resist the pressure difference between the dummy regions 522 and the panel group regions 524 under the conjugating of the second substrate onto the adhesive structure 540. Therefore, the adhesive structure 540 can be keep intact, to increase the yield rate of the liquid crystal display panels 500 with less consumption of the liquid crystal.

It should be noted that, the arrangement of the dummy regions 522 and the gaps 526 described herein is only an example, and not intended to limit the present disclosure, the arrangement of the dummy regions 522 and the gaps 526 could be adjusted to actual demand by those skilled in the art. That is to say, the arrangement of the dummy regions 522 and the gaps 526 is to support the adhesive structure 540 to resist the pressure difference between the dummy regions 522 and the panel group regions 524 during the conjugating of the second substrate, in order to keep the adhesive structure 540 intact.

Figure 7:
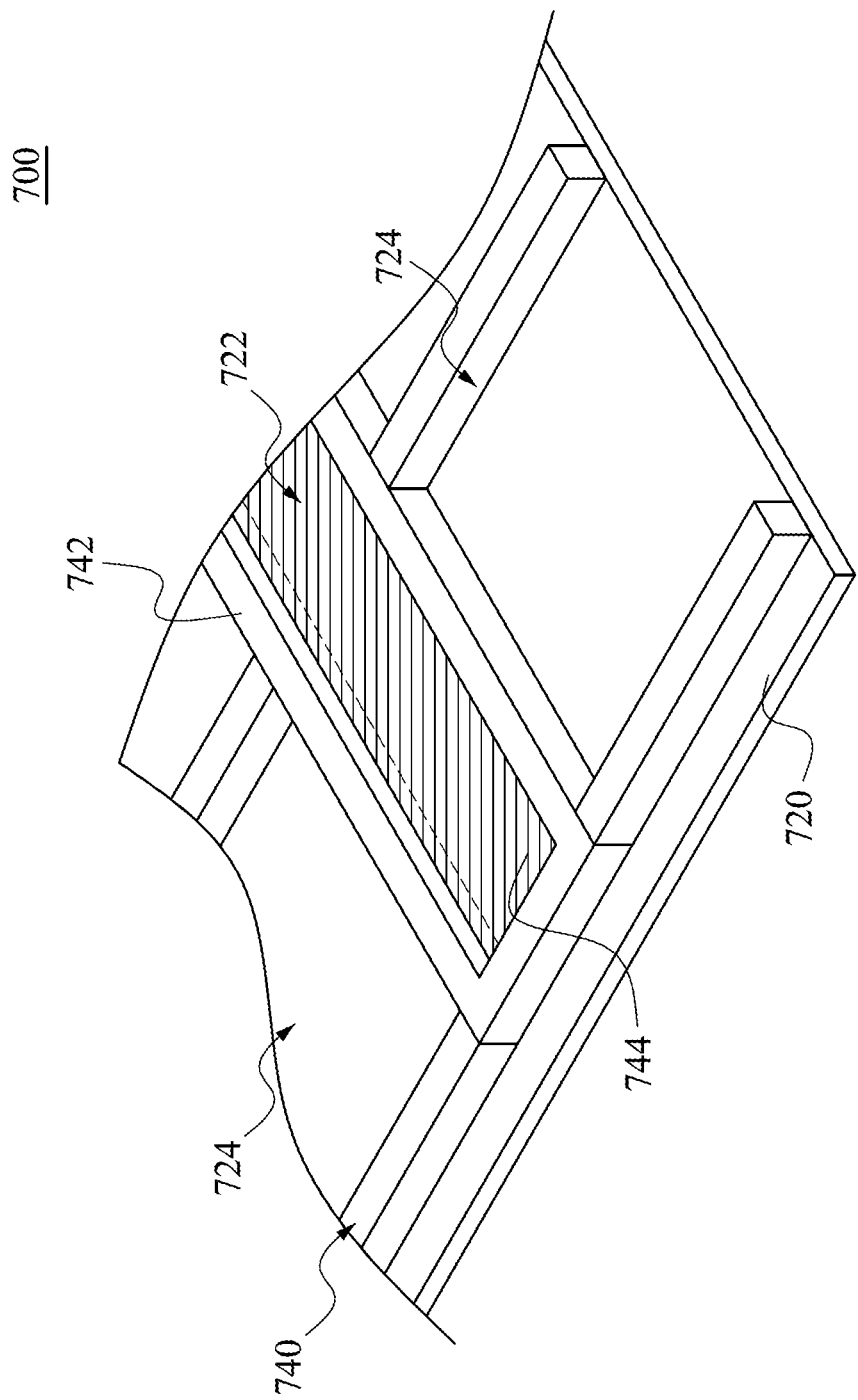
FIG. 7 to FIG. 8 are longitudinal sectional views of liquid crystal display panels under sequential fabricating processes according to other embodiment of the present disclosure.
Figure 8:
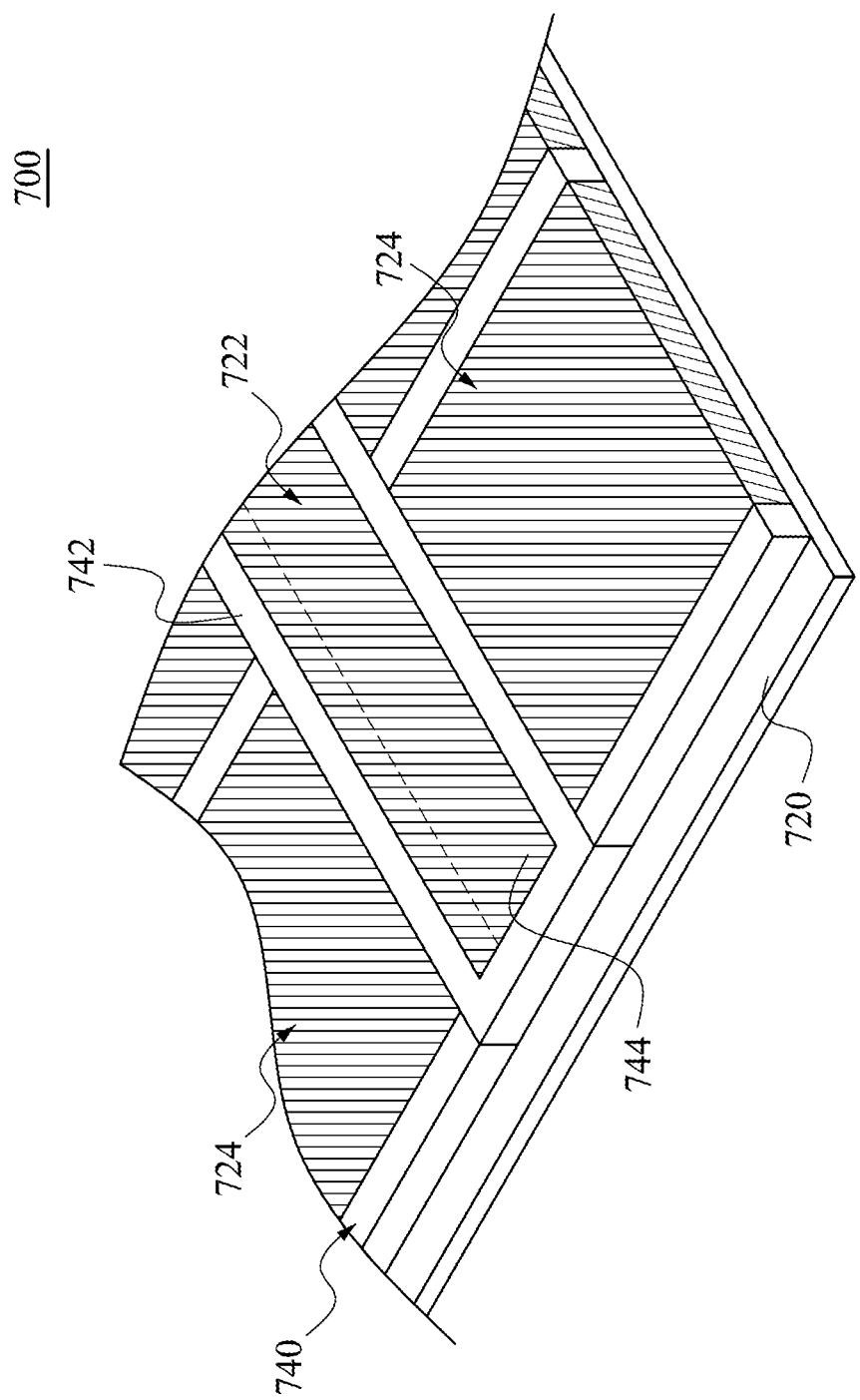

FIG. 7 to FIG. 8 illustrate longitudinal sectional views of liquid crystal display panels 700 under sequential fabricating processes according to other embodiment of the present disclosure. While the curable adhesive being coated or disposed onto the first substrate 720 to partition the first substrate 720 into at least one dummy region 722 and the panel group regions 724, in addition, the curable adhesive can also be coated inside the at least one dummy region 722, and then the curable adhesive is cured to form the adhesive structure 740 including a barrier portions 742 and a reinforced structure 744 inside the dummy region 722. The barrier portions 742 and the dummy region 722 with the reinforced structure 744 are located between the two adjacent panel group regions 724.

It should be noted that, the curable adhesive of the reinforced structure 744 can be coated inside the dummy region 722 either at the same time as the coating of the curable adhesive forming the adhesive structure 740 or after the adhesive structure 740 is formed. Furthermore, the curing of the curable adhesive forming the reinforced structure 744 can also be processed either at the same time as the curing of the curable adhesive forming the adhesive structure 740 or after the adhesive structure 740 is formed. In some embodiments, the reinforced structure 744 may fill up the dummy region 722. In some embodiments, the reinforced structure may occupy at least part of the dummy region 722.

Thereafter, as shown in FIG. 8, liquid crystal is poured into the panel group regions 724, to fill up the panel group regions 724, and the residual air inside the panel group regions 724 is fully eliminated. As to the dummy region 722 with the reinforced structure 744, the liquid crystal can either fill up the rest space of the dummy region 722 or not, which could be adjusted to actual demand by those skilled in the art. Subsequently, as FIG. 4 illustrated, a second substrate can also be conjugated or bonded at a side of the first substrate 720 disposed with the adhesive structure 740.

Due to the fabricating of the liquid crystal display panels 700 disposes the reinforced structure 744 inside the dummy regions 722, such that the reinforced structure 744 can provide supporting for the barrier portions 742 to resist the pressure difference between the dummy regions 722 and the panel group regions 724 under the conjugating of the second substrate onto the adhesive structure 740. Therefore, the barrier portions 742 can be keep intact, to increase the yield rate of the liquid crystal display panels 700 with less consumption of the liquid crystal.

Figure 9:
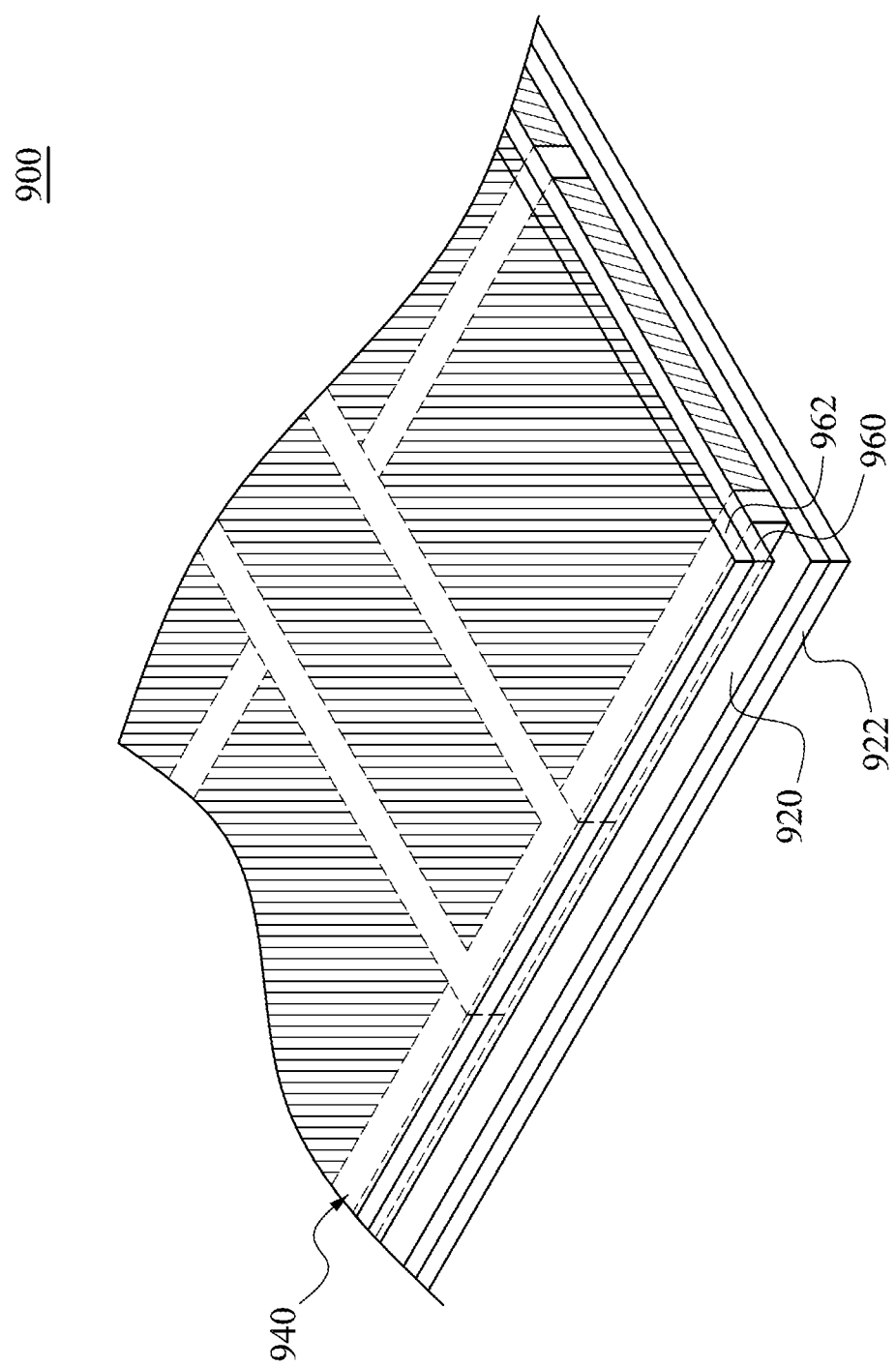
FIG. 9 is a longitudinal sectional view of liquid crystal display panels under sequential fabricating processes according to other embodiment of the present disclosure.

FIG. 9 is a longitudinal sectional view of liquid crystal display panels 900 under sequential fabricating processes according to other embodiment of the present disclosure. In some embodiments, the forming of the liquid crystal display panels 900 may further include forming a thin film transistor array 962 on a second substrate 960. In some embodiments, the thin film transistor array 962 is formed on the surface of the second substrate 960 far away from a first substrate 920. In some embodiments, the forming of the liquid crystal display panels 900 may further include forming a touch sensing layer 922 on the first substrate 920. In some embodiments, the touch sensing layer 922 is formed on a surface of the first substrate 920 far away from the second substrate 960. In some embodiments, material of the touch sensing layer 922 can be indium tin oxide (ITO), silver or other suitable material.

Summarized from the above, the present disclosure provides a method for fabricating liquid crystal display panels, including forming at least one adhesive structure on a first substrate, to partition the first substrate into at least one dummy region and panel group regions, in which the dummy region is located between the two adjacent panel group regions; pouring liquid crystal into the dummy region and the panel group regions; and conjugating a second substrate at a side of the first substrate disposed with the adhesive structure, to seal spaces of the dummy region and the panel group regions between the first substrate and the second substrate, in which the liquid crystal can fill up the spaces of the panel group regions and at least a part of the spaces of the dummy region being sealed between the first substrate and the second substrate. The liquid crystal poured into the dummy region can eliminate residual air inside the dummy region and support the adhesive structure to resist the pressure difference between the dummy region and the panel group regions, to avoid or decrease the risk that the residual air penetrates into the panel group regions and keep the adhesive structure intact.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A method for fabricating liquid crystal display panels, comprising:

forming at least one adhesive structure comprising a plurality of barrier portions on a first substrate, to partition the first substrate into at least one dummy region and a plurality of panel group regions, wherein all of the dummy region is located between two adjacent panel group regions and surrounded by the barrier portions, the dummy region is separated from the panel group regions by parts of the barrier portions, and the panel group is defined by at least one side of the barrier portions and at least one side of the dummy region;

pouring liquid crystal into the dummy region and the panel group regions; and conjugating a second substrate at a side of the first substrate disposed with the adhesive structure, to seal spaces of the dummy region and the panel group regions between the first substrate and the second substrate, wherein the liquid crystal fills up the spaces of the panel group regions and at least a part of the dummy region sealed between the first substrate and the second substrate.

2. The method of claim 1, wherein at least part of the adhesive structure are composed by the barrier portions.

3. The method of claim 2, wherein pouring the liquid crystal into the dummy region and the panel group regions is pouring the liquid crystal to fill up spaces of the barrier portions sealing between the first substrate and the second substrate.

4. The method of claim 2, wherein any of the two adjacent panel group regions have one of the barrier portions disposed inbetween.

5. The method of claim 2, wherein any of the two adjacent panel group regions have a plurality of the barrier portions disposed inbetween.

6. The method of claim 5, wherein the barrier portions disposed between two adjacent panel group regions have a gap between any of two adjacent barrier portions.

7. The method of claim 1, wherein forming the adhesive structure on the first substrate comprises:
  coating a curable adhesive on the first substrate, to partition the dummy region and the panel group regions; and
  curing the curable adhesive, to form the adhesive structure.

8. The method of claim 7, wherein forming the adhesive structure on the first substrate further comprises:
  coating the curable adhesive inside at least a part of the dummy region on the first substrate.

9. The method of claim 7, wherein the curable adhesive is a light-curing adhesive or a heat-curing adhesive.

10. The method of claim 1, further comprising forming a thin film transistor array on a surface of the second substrate opposite to the first substrate.

11. The method of claim 1, further comprising forming a touch sensing layer on a surface of the first substrate opposite to the second substrate.

12. The method of claim 1, wherein the panel group regions comprise a plurality of liquid crystal display panels, and the method further comprises cutting the panel group regions, to fabricate the liquid crystal display panels.

* * * * *